United States Patent Office 3,155,641
Patented Nov. 3, 1964

3,155,641
POLYMERIZATION OF ARYLLITHIUM-TITANIUM TRIHALIDE CATALYSTS
Irving Kuntz, Westfield, N.J., assignor to Esso Research and Engineering Company, a corporation of Delaware
No Drawing. Filed Nov. 28, 1961, Ser. No. 155,449
14 Claims. (Cl. 260—93.7)

This invention relates to improved catalyst compositions for the low pressure polymerization of propylene. More particularly, it relates to the polymerization of propylene with catalysts of titanium trihalides and improved aryllithium compounds.

For the purpose of convenience, details of the low pressure catalytic process for the preparation of the polypropylene are presented below although it should be realized that these by themselves constitute no part of this invention. The process is generally described in the literature, e.g., see "Scientific American," September 1957, pages 98 et seq.

In that process the polymers are prepared by polymerizing the monomer with the aid of certain polymerization catalysts. The catalysts are reaction products obtained by partially reducing a heavy metal compound usually the halide of a Group IV-B, V-B and VI-B metal of the Periodic System, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33$ $AlCl_3$ thus containing cocrystallized $AlCl_3$. (For further details, see U.S. Patent 3,032,510, filed June 27, 1958, and U.S. Patent 3,032,513, filed October 10, 1958.) $TiCl_3$ may also be produced by other techniques such as reducing $TiCl_4$ with $H_2$ for example. The catalyst proper is then conventionally produced by reacting the titanium halide with an organometallic compound.

The monomer is then contacted with the resulting catalyst in the presence of inert hydrocarbon solvents such as isopentane, n-heptane, xylene, etc. or chlorobenzene. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid and the polymer product concentration and the polymerization zone is preferably kept between about 2 to 25% based on total contents so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and deactivating the catalyst and for precipitating crystalline polymer product from solution.

The polymers produced have number average molecular weights in the range of about 100,000 to 300,000 or even as high as 3,000,000 as determined by the intrinsic viscosity method using the I. Harris correlation (J. Polymer Science, 8, 361 (1952)). The polymers can have a high degree of crystallinity and a low solubility in n-heptane.

The great commercial interest in the low pressure polymerization process makes it desirable to provide further catalyst improvements and refinements. Thus, for example, catalysts of greater activity give rise to less deashing problems. Catalysts which do not use aluminum alkyls eliminate the problem of the persistence of this element as an ash component.

It has now been found that in the polymerization of propylene with a titanium trihalide, the use as activators of solid aryllithium compounds having the formula: $(ArLi)_n(LiX)$ gives surprisingly high yields. It is surprising that this should be so since polymerization with the related lithium-butyl compound gives yields less than half as great and aryllithium compounds prepared in ether solutions are practically inactive.

The titanium trihalides employed include the chlorides, bromides, and iodides with the first two preferred. The titanium trihalide can be prepared by a number of means including hydrogen reduction. Particularly preferred is the titanium trichloride containing cocrystallized $AlCl_3$ as mentioned before.

The aryllithium compounds, as stated previously, have the formula: $(ArLi)_n(LiX)$ where Ar is an aryl radical, $n$ is an integer of from 2 to 20 and X is halogen chlorine, bromine, or iodine. Compounds having a mixture of X radicals e.g. Br and Cl have been prepared and can be used. The aryl group can have one or more aromatic rings and substituted groups attached thereto. Typical aryl radicals thus are p-tolyl, 1-naphthyl 3-n-octyl phenyl, etc. Especially preferred and desirable are the compounds $(C_6H_5Li)_n(LiBr)$, where $n$ varies from 4 to 11.

The aryllithium materials are prepared by the reaction of the corresponding aryl halide, e.g., $C_6H_5Br$ with a lower alkyllithium, e.g., butyllithium in a hydrocarbon diluent. The reaction is carried out at temperatures of 0° C. to 100° C. for reaction periods determined by reagent concentrations. The products are pyrophoric materials insoluble in the hydrocarbon.

Typical hydrocarbons that can be employed are conventional hydrocarbon diluents such as benzene, heptane, hexane, cyclohexane, kerosine fractions free of olefin, alkylate bottoms, etc. The aryllithium can be filtered off, used in the solvent in which it is synthesized, or reslurried in fresh solvent.

The aryllithiums prepared in this manner differ chemically from those prepared in ethers and also in terms of activity as polymerization catalysts. It is thus important that the aryllithiums of this invention be free of ether solvents or ether molecules of solvation.

The catalyst components in this process are handled for the most part in the same manner as the conventional operation except that the aryllithium is in the form of a dispersion in a diluent (which may be the same as that employed in the polymerization itself). Molecular ratio of the aryllithium to the titanium trihalide is in the range of 0.2 to 3.5, preferably 1 to 2.5.

This invention and its advantages will be better understood by reference to the following examples:

*Example 1*

Propylene was polymerized with $TiCl_3$ containing cocrystallized $AlCl_3$ activated by three different materials: butyllithium, phenyllithium prepared in the presence of diethyl ether, and a phenyllithium $(C_6H_5Li)_7(LiBr)$ of this invention. Further conditions and details are indicated in the table presented below.

PROPYLENE POLYMERIZATIONS WITH $(C_6H_5Li)_nLiBr$

| Preparation | $C_6H_5Li$ in Ether | $C_6H_5Li$ Solid Etherate | BuLi | $(C_6H_5Li)_7LiBr$ | $(C_6H_5Li)_{11}LiBr$ |
|---|---|---|---|---|---|
| Li/Ti Ratio | 2.3 | 2.3 | 2.3 | 2.3 | 2.3 |
| Catalyst Efficiency, w./w. Ti Compound | 0.2 | 5.0 | 77 | 148 | 174 |
| Tensile | | | 1530 | 1430 | 1090 |
| Flexural Stiffness | | | 23,700 | 20,900 | 30,100 |
| Inherent Viscosity | | 7.76 | 7.76 | 6.65 | 7.87 |

Polymerization at 100° C., xylene solution about 30% monomer concentration, using 2.5 mmoles of $TiCl_3-1/3$ $AlCl_3$.

These data demonstrate the great increase in efficiency obtained with the materials of this invention.

Where a similar experiment was carried out with $TiCl_3$ the following data were obtained:

| | BuLi | $(C_6H_5Li)_7LiBr$ |
|---|---|---|
| Catalyst Efficiency, w./w. | 3 | 78 |

This demonstrates again the enhanced catalyst activity of the materials of this invention.

Various organic compounds can be utilized as third components to further activate the catalyst systems of this invention or to increase the crystallinity of the products or both. Typical of these materials are: dialkylcarbanilides, 4,4¹-methylene bis-(dimethylaniline) and N,N-dimethylaniline.

The advantages of this invention will be apparent to the skilled in the art. Improved catalyst systems of increased activity and decreased ash problems are made available. Polymer product improvement such as increased flexural stiffness can be obtained.

It is to be understood that this invention is not limited to the specific examples which have been offered merely as illustrations and that modifications may be made without departing from the spirit of the invention.

What is claimed is:

1. In a process for polymerizing propylene in the presence of a catalyst formed by admixing a titanium trihalide with an organometallic compound, the improvement which comprises utilizing as the organometallic compound an aryllithium having the formula $$(ArLi)_n(LiX)$$

where Ar is an aryl radical, $n$ is an integer of from 2 to 20, and X is a halogen radical.

2. The process of claim 1 in which the titanium halide is selected from the group consisting of titanium trichloride and titanium tribromide.

3. The process of claim 2 in which the molecular ratio of the aryllithium to titanium trihalide is in the range of 0.2 to 3.5.

4. The process of claim 3 in which $(ArLi)_n(LiX)$ is $(C_6H_5Li)_7(LiBr)$ and the titanium compound is a titanium trichloride.

5. A catalyst composition comprising a titanium trihalide and an aryllithium having the formula $$(ArLi)_n(LiX)$$

where Ar is an aryl radical, $n$ is an integer of from 2 to 20, and X is a halogen radical.

6. The composition of claim 5 in which the titanium halide is selected from the group consisting of titanium trichloride and titanium tribromide.

7. The composition of claim 6 in which the molecular ratio of the aryllithium to titanium trihalide is in the range of 0.2 to 3.5.

8. The composition of claim 7 in which the aryllithium is $(C_6H_5Li)_7(LiBr)$ and the titanium compound is a titanium trichloride.

9. A catalyst composition comprising a titanium trihalide being selected from the group consisting of titanium trichloride and titanium tribromide, and an aryllithium having the formula $(ArLi)_n(LiBr)$, where Ar is an aryl radical and "$n$" is an integer of from 4 to 11.

10. The composition of claim 9, in which the molecular ratio of the aryllithium to titanium trihalide is in the range of 0.2 to 3.5.

11. In a process for polymerizing propylene in the presence of a catalyst formed by admixing a titanium trihalide with an organometallic compound, the improvement which comprises utilizing as the organometallic compound an aryllithium having the formula $$(ArLi)_n(LiBr)$$

where Ar is an aryl radical and "$n$" is an integer of from 4 to 11, said compound having been prepared in the absence of ethers by the reaction of bromobenzene with a lower alkyllithium in a hydrocarbon diluent at a temperature in the range of from about 0 to 100° C.

12. The process of claim 11, in which the molecular ratio of the aryllithium to titanium trihalide is in the range of 0.2 to 3.5.

13. The process of claim 1, wherein the titanium trihalide is titanium trichloride co-crystallized with aluminum chloride.

14. The composition of claim 5, wherein the titanium trihalide is titanium trichloride co-crystallized with aluminum chloride.

References Cited in the file of this patent

UNITED STATES PATENTS 3,001,951    Tornqvist et al.    Sept. 26, 1961
3,027,360    Raum    Mar. 27, 1963

OTHER REFERENCES

Coates: "Organometallic Compounds" page 9, John Wiley & Sons (1960).